(12) United States Patent
Gu et al.

(10) Patent No.: US 8,908,227 B2
(45) Date of Patent: Dec. 9, 2014

(54) IMAGE FORMING APPARATUS, IMAGE FORMING SYSTEM, IMAGE DATA PROCESSING METHOD, PROGRAM, AND STORAGE MEDIUM

(71) Applicants: Chan Gu, Tokyo (JP); Saori Iura, Kanagawa (JP); Yuichi Yoshida, Kanagawa (JP); Takahiro Hirakawa, Kanagawa (JP); Yasuyuki Igarashi, Kanagawa (JP); Isamu Mitsuke, Kanagawa (JP); Nobuyuki Iwata, Kanagawa (JP)

(72) Inventors: Chan Gu, Tokyo (JP); Saori Iura, Kanagawa (JP); Yuichi Yoshida, Kanagawa (JP); Takahiro Hirakawa, Kanagawa (JP); Yasuyuki Igarashi, Kanagawa (JP); Isamu Mitsuke, Kanagawa (JP); Nobuyuki Iwata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/654,660

(22) Filed: Oct. 18, 2012

(65) Prior Publication Data

US 2013/0107288 A1 May 2, 2013

(30) Foreign Application Priority Data

Nov. 1, 2011 (JP) .................................. 2011-240318

(51) Int. Cl.
*H04N 1/00* (2006.01)
*G06K 15/02* (2006.01)

(52) U.S. Cl.
CPC ........ *G06K 15/1822* (2013.01); *G06K 15/1807* (2013.01)
USPC ........................... 358/1.6; 358/1.16; 358/1.18

(58) Field of Classification Search
CPC ............ G06K 1/00; G06K 15/02; H04N 1/60
See application file for complete search history.

(56) References Cited

U.S. PATENT DOCUMENTS

2009/0021790 A1* 1/2009 Krovitz et al. ............... 358/1.18
2010/0014108 A1* 1/2010 Nagai ............................. 358/1.9
2010/0195131 A1* 8/2010 Nakata ......................... 358/1.13

FOREIGN PATENT DOCUMENTS

| JP | 2007-257069 | 10/2007 |
| JP | 2009-301168 | 12/2009 |
| JP | 2010-003108 | 1/2010 |
| JP | 2010-003236 | 1/2010 |

* cited by examiner

*Primary Examiner* — Fred Guillermety
*Assistant Examiner* — Henok A Shiferaw
(74) *Attorney, Agent, or Firm* — Harness, Dickey & Pierce, P.L.C.

(57) ABSTRACT

The purpose of this invention is to avoid unnecessary print out and cut wasteful consumption of resources and electricity. A printer receives a command indicating whether or not a user does not need to print out images such as advertisements on web pages. If a drawing command acquired by analyzing received print data is image, the printer determines whether or not the command is to draw images based on the user's choice and execute a drawing process along with the command from the user. Consequently, the printer can print out text information with eliminating image information which is noise for the user and can eliminate print out for unnecessary image information.

12 Claims, 14 Drawing Sheets

IMAGE FORMING APPARATUS, IMAGE FORMING SYSTEM, IMAGE DATA PROCESSING METHOD, PROGRAM, AND STORAGE MEDIUM

CROSS-REFERENCE TO RELATED APPLICATION

This patent application is based on and claims priority pursuant to 35 U.S.C. §119 to Japanese Patent Application No. 2011-240318, filed on Nov. 1, 2011, the entire disclosure of which is hereby incorporated by reference herein.

BACKGROUND OF THE INVENTION

1. Field of the Invention

The present invention relates to an image forming apparatus that executes a drawing process based on print data and forms images on recording paper based on generated image data for output, such as printers and multifunctional peripherals (MFPs). More particularly, the present invention relates to an image forming apparatus, image forming system, method of processing image data for output that executes an image outputting process without drawing image data for print data to be processed, a program to implement the process described above, and a storage medium that stores the program.

2. Description of the Related Art

Sometimes a user browses articles such as newspaper articles and web pages reported via various media and prints out those articles that the user browsed, storing them in the form of a recordation on paper. Regarding web pages, after receiving a command to print out a web page acquired from a network and browsed, a personal computer (PC) converts it to print data in a format that apparatuses such as printers and MFPs can process, and sends the generated print data as print commands to these output apparatuses. A printer driver installed in the PC generates the print data, which consists of various drawing objects such as text, graphics, and images, and the print data is printed under conditions corresponding to attributes of each drawing object. Also, regarding newspaper articles printed on paper, after scanning a document to be processed by using an image scanner, the image data generated by the scanner is converted to image data for printing out, and a printer generates (copies) images on paper by using the image data in a format suitable for storing.

Conventionally, when a user browses web pages that mainly contain text information and requests to print out necessary web pages, a printer driver generates print data that contains all data including image data in addition to text data in the page to be processed and a printing process is executed by using the generated print data. However, the page to be printed out sometimes includes advertisements and the like that have no relation to the content of the original article on the page. Also, in many cases, these kinds of advertisements and the like use large image sizes and vivid colors to make a strong impact on consumers. Some users do not need such images and under these circumstances it is waste of resources to print them out.

To cope with this issue, when a user prints out a web page, a method to eliminate data that the user does not need from data that consists of the browsed web page has been proposed (e.g., JP-2007-257069-A.) In JP-2007-257069-A, a method is employed using an elimination list of advertisement Uniform Resource Locaters (URLs) to be eliminated linked to banner advertisements to delete the banner advertisements in case of printing a web page and generates print data ignoring tags that contain URLs in the elimination list in case of printing the web page.

However, the method described above eliminates only those banner advertisements linked to URLs in the elimination list, and is insufficient in terms of eliminating print-out of unnecessary image information that has no relation to the content of an article with mainly text information and cutting waste generated by printing unnecessary images.

BRIEF SUMMARY OF THE INVENTION

The present invention provides a novel image forming apparatus, method, and system that facilitates not outputting unnecessary image information included in print data.

More specifically, the present invention provides an image forming apparatus that executes a drawing process based on print data to generate image data for output and forms images based on the generated image data for output, and includes an output command receiving unit that receives command indicating whether or not printing of image data included in the print data to be executed the drawing process is unnecessary, an image data detecting unit that detects image data from the print data to be executed the drawing process, and a control unit that outputs image without drawing the image data detected by the image data detecting unit in case the output command receiving unit receives a command which tells that it is unnecessary to output the image data.

The present invention provides an image forming apparatus that facilitates printing out necessary information only by generating output image data that does not include unnecessary image information from print data that includes unnecessary image information, and that can cut waste regarding printing out.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION OF THE PREFERRED EMBODIMENTS

Figure 1:
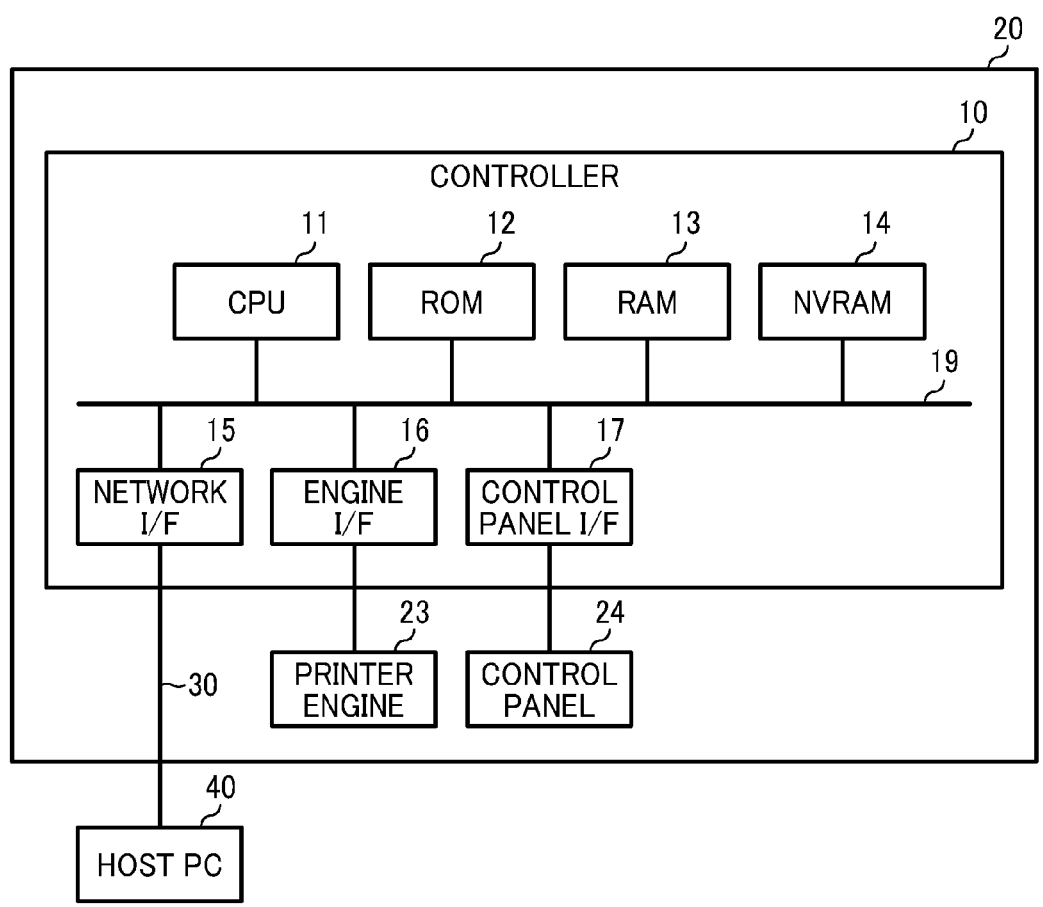
FIG. 1 is a diagram illustrating a hardware architecture of a printer as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

An embodiment of the present invention will be described in detail below with reference to the drawings. In this embodiment, a description is given of a printer as an example of an image forming apparatus that executes a drawing process based on print data written in Page Description Language (PDL), hereinafter referred as PDL data, and forms images for output using the generated image data. This printer has the ability to execute an image outputting process that replaces image data with a blank without executing a drawing process for unnecessary image data, in a drawing process for print data.

This ability to execute an image outputting process switches operating modes between executing an image not drawing process in case a user indicates that outputting image data is not necessary and executing a normal image outputting process that outputs all of the received print data including image data. That is, the printer of this invention can print necessary text information eliminating image information which is noise to a user by telling the printer whether or not outputting image data is necessary, and that can cut waste of resources. It should be noted that although a printer is taken as an example embodiment of an image forming apparatus in the explanation described above, any apparatus that is equipped with a printer engine and can print out print data such as MFPs can be used.

FIG. 1 is a diagram illustrating a hardware architecture of a printer in this embodiment of the present invention. A printer 20 includes a controller 10 that controls the whole printer, a printer engine 23 that forms images on a recording sheet based on drawing image data for output, and a control panel 24 that includes a displaying unit and an operating unit such as input keys and functions as a user interface.

The controller 10 includes a Central Processing Unit (CPU) 11 that executes commands in a software program, a Read Only Memory (ROM) 12 that stores control programs and control data used by the CPU 11 in order to have the controller work, a Random Access Memory (RAM) 13 used as page (frame) memory that temporarily stores drawing image data for output generated by the control program and data necessary for operating software programs, and a Non-volatile RAM (NVRAM) 14 that stores setting data such as processing conditions depending on apparatus and management information of the printer 20. That is, the controller 10 consists of a computer that includes the CPU 11 and associated memory devices, that is, the ROM 12, the RAM 13, and the NVRAM 14.

Furthermore, the controller 10 includes an engine interface (I/F) 16 that exchanges data with the printer engine 23, a control panel I/F 17 that exchanges data with the control panel 24, and a network I/F 15 that exchanges data with a PC 40 connected via a network and equipped with a print data generating unit such as a printer driver as a host apparatus (hereinafter referred to as host PC 40). It should be noted that elements included in the controller 10 described above are connected with each other via an internal bus 19. Also, a system that consists of the host PC 40 connected to the network I/F 15 via a communications unit (not shown in figures) and the printer 20 is referred to as an image forming system.

The controller 10 executes a drawing process including various conversion processes based on print data received from the host PC 40, generates image data for output, and has the printer engine 23 print out the image data. The RAM 13 stores print data from the host PC 40, image data generated from the print data in intermediate data format, pixel data in raster format, and image data generated in subsequent processes for printing out.

The CPU 11 in the controller 10 implements functions shown in FIG. 2 (described later) by reading out control programs and setting information regarding operating conditions for controlling and processing stored in storage devices such as the ROM 12 and the NVRAM 14, loading them into the RAM 13 that provides working memory area for the CPU 11, and using the RAM 13 as working area for image forming processing.

The host PC 40 converts document (including web pages) created or processed by an application into print data that describes drawing conditions including various drawing commands, sends the converted print data to the printer 20 via a network 30, and requests the printer 20 to print out the print data. Drawing commands described above are commands that usually specify drawing objects such as text, images, and graphics. Also, the print data described above is written in various page description languages (PDLs) such as PostScript, PCL, and RPDL.

Figure 2:
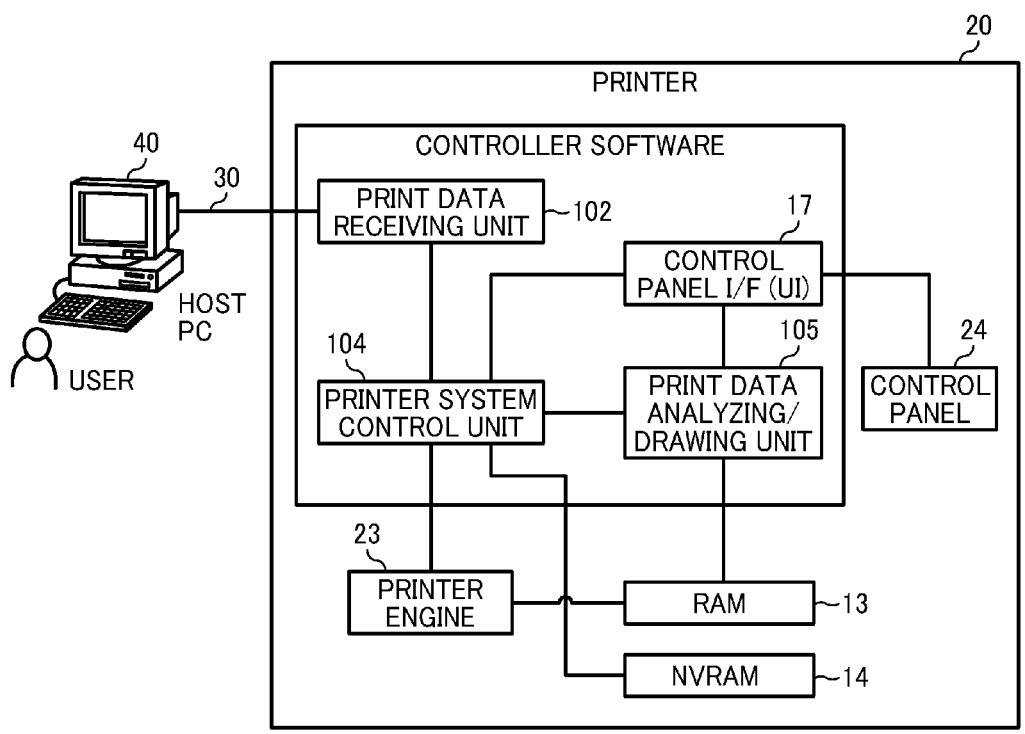
FIG. 2 is a block diagram illustrating a software architecture of a data processing system implemented on the controller shown in FIG. 1 as an embodiment of the present invention.

FIG. 2 is a block diagram illustrating a software architecture of a data processing system implemented on the controller shown in FIG. 1 in this embodiment. The data processing system comprised of software in the controller 10 shown in FIG. 2 includes a printer system control unit 104, a print data receiving unit 102, a print data analyzing/drawing unit 105, and the control panel I/F 17 as function implementing units by program in the controller 10.

The print data receiving unit 102 receives print data input to the printer 20 from the host PC 40 via a communications unit.

The printer system control unit 104 controls the whole printer 20, and manages printer status and processing of input print data including image output based on the print data. In managing the status of the printer 20, the printer system control unit 104 exchanges information with the control panel 24 via the control panel I/F 17 that functions as a user interface (UI). That is, the printer system control unit 104 notifies the user of the status of the printer 20 and receives commands to the printer 20 from the user dialogically. In processing output images, the printer system control unit 104 acquires print data received by the print data receiving unit 102 and transfers necessary information to analyze or draw the print data to the print data analyzing/drawing unit 105. The printer system control unit 104 has the print data analyzing/drawing unit 105 execute an image outputting process in an operating mode in which either image data is drawn or image data is not drawn in response to a command that indicates whether or not outputting of image data is necessary in the printing out described above.

The print data analyzing/drawing unit 105 analyzes the print data, generates intermediate data that indicates drawing conditions that consist of drawing commands (drawing objects and their attributes) and drawing setting information including color and transparency settings, and generates image data for printing out by executing a rendering process for each drawing object based on the generated intermediate data. The generated image data is stored in the RAM 13. It should be noted that the print data analyzing/drawing unit 105 does not execute a drawing process for image drawing objects in case the printer system control unit 104 indicates the operating mode in which image data is not drawn to the print data analyzing/drawing unit 105.

A user can choose the operating mode in which image data is not drawn by inputting a command from the control panel 24 (shown in FIG. 6 described later). Otherwise, the operating mode in which image data is not drawn is chosen by a printer driver by adding command data that indicates outputting of image data is unnecessary in part of the print data.

It should be noted that an image data detecting unit detects image data in print data in the process in which image data is not drawn. More specifically, in case of print data written in PDL for the printer of this embodiment, image data in the print data is detected based on analyzing drawing commands in generating image data for printing out based on the PDL data. Alternatively, in case print data scanned by a scanner is input, for example, image data in the print data is detected by an image data detecting unit from the input data from the scanner (e.g., an image area separating unit, described later.)

Next, in case a user sends a command indicating that outputting of image data is unnecessary to the printer of this embodiment, a control operation that executes an image outputting process in response to the command from the user will be described below in detail. It should be noted that the case in which print data is PDL data is taken as an example in the description below. If a user determines that image data included in a text-centric web page is unnecessary, the user commands to print out without outputting image data via the control panel 24, etc., when the user requests to print out the web page. The printer system control unit 104 has the print data analyzing/drawing unit 105 execute the image outputting process with the operating mode in which image data is not drawn.

Next, regarding printers described below in first to the fifth embodiments, each process executed when the operating mode in which image data is not drawn is chosen by a user operation is described below with reference to flowcharts. A printer in the first embodiment executes a standard image outputting process in the operating mode in which image data is not drawn. Printers in the second embodiment to the fourth embodiment execute a process of filling a blank generated by not drawing image data in addition to an image outputting process for text data in case the operating mode in which image data is not drawn is chosen. A printer in the fifth embodiment executes an image data drawing process as an exception in an image outputting process in the operating mode in which image data is not drawn with the printer in the first embodiment.

First Embodiment

After receiving a command that chooses the operating mode, in which image data is either drawn or image data is not drawn, the printer system control unit 104 in the printer 20 of this embodiment executes a standard operation involving an image outputting process based on print data in the operating mode in which image data is not drawn. It should be noted that image data is not output in the operating mode in which image data is not drawn, and that is different from a conventional image outputting process in which all of print data including image data is output.

Figure 3:
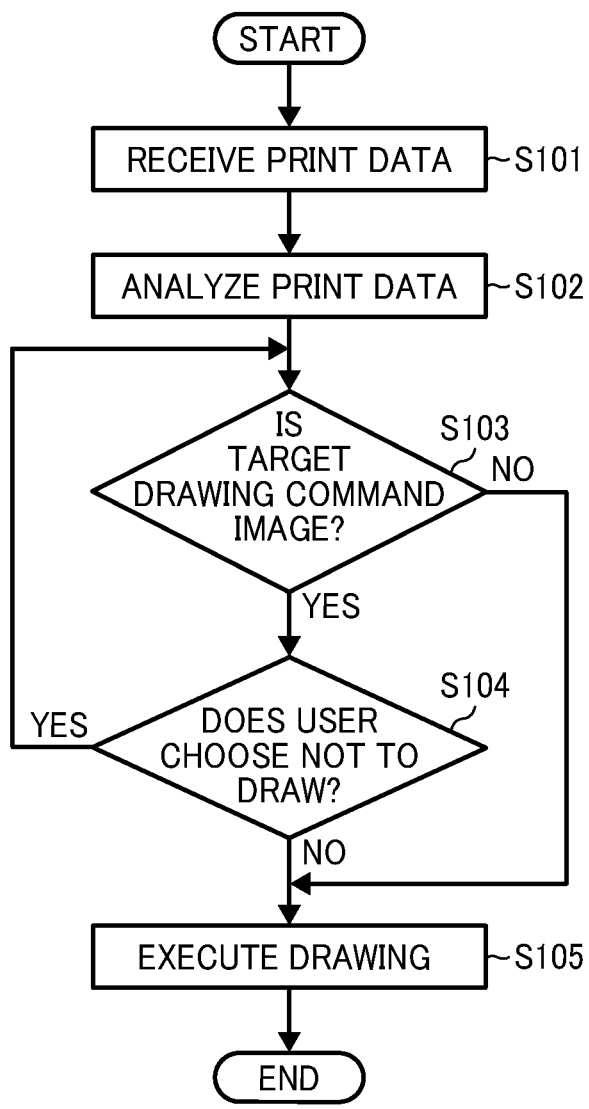
FIG. 3 is a flowchart illustrating an image outputting process on a printer in a first embodiment of the present invention in an operating mode in which image data is not drawn.

FIG. 3 is a flowchart illustrating an image outputting process on the printer of this embodiment in the operating mode in which image data is not drawn. After turning on the printer 20 and finishing an initialization process, the printer system control unit 104 starts the process flow shown in FIG. 3 immediately if it determines that it can receive print data. After starting the process flow shown in FIG. 3, the printer system control unit 104 waits for print data and acquires received print data passed from the print data receiving unit 102 that receives print data sent from the host PC 40 (S101).

Figure 4A:
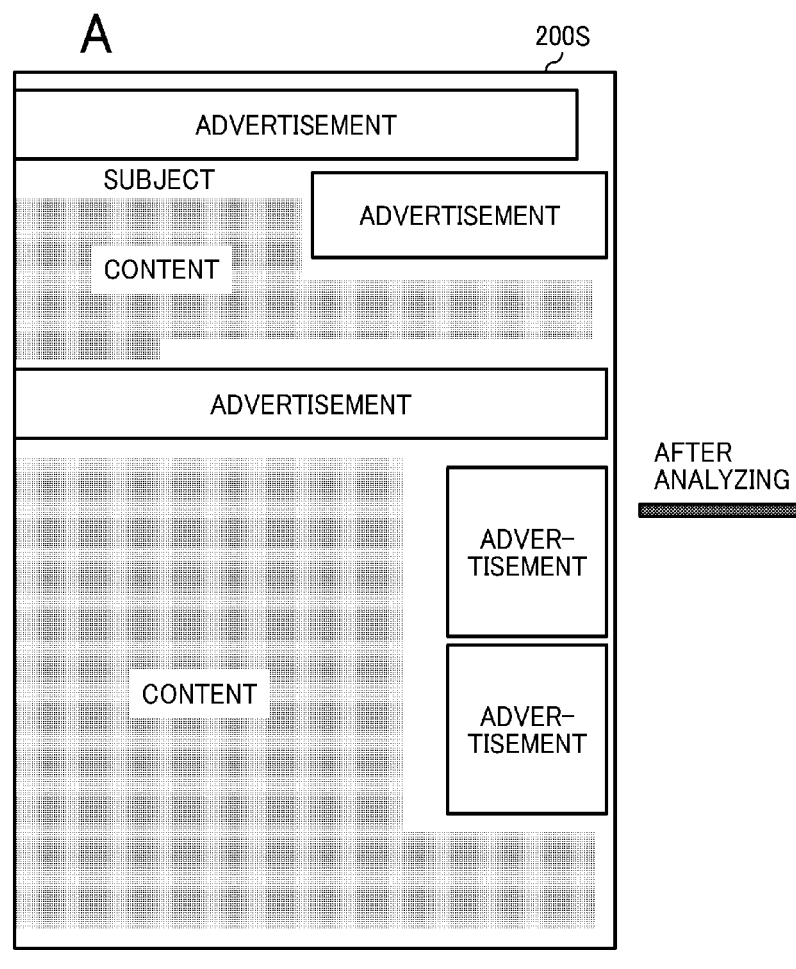
FIG. 4A and FIG. 4B are diagrams illustrating a process of analyzing print data on the printer in the first embodiment of the present invention.
Figure 4B:
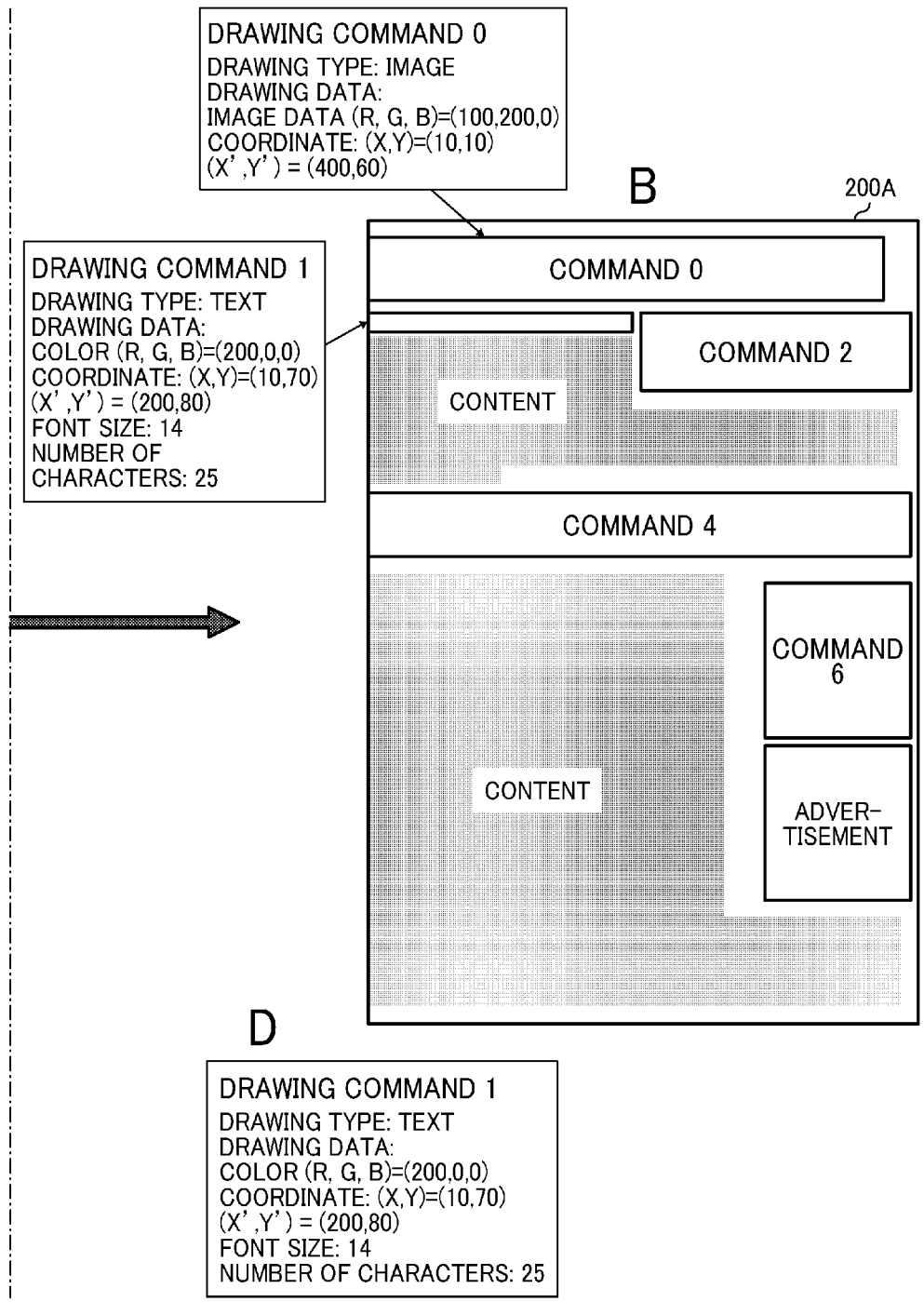

The received print data is PDL data and the PDL data is written in a format with a plurality of drawing commands as shown in FIG. 4A and FIG. 4B. Therefore, the printer system control unit 104 analyzes the print data and generates intermediate data that indicates drawing conditions including various drawing commands (drawing objects and their attributes) and drawing setting information, etc. (S102). The print data analyzing/drawing unit 105 analyzes the print data.

FIG. 4A and FIG. 4B are diagrams illustrating a process of analyzing print data on the printer of this embodiment. A in FIG. 4A illustrates an example of data contents of print data 200S, and the data contents consist of images in "advertisement" fields and strings in other fields. Each of a plurality of rectangular areas that consist of print area of the print data 200S is equivalent to a unit for drawing command to indicate drawing data. Therefore, after the print data 200S is analyzed, drawing commands for data contents in intermediate data 200A shown in B in FIG. 4B are acquired as analysis results.

A drawing command 0 in the intermediate data 200A generated by analyzing the print data 200S corresponds to an advertisement field in the upper part of the print area. As shown in C in FIG. 4A, the drawing command 0 indicates "image" as drawing type and commands by data that defines color and a drawing area as drawing data. Also a drawing command 1 in the intermediate data 200A corresponds to a string field next to the advertisement field in the upper part of the print area. As shown in D in FIG. 4B, the drawing command 1 indicates "text" as drawing type and commands by data that defines color, drawing area, font size, and number of characters as drawing data. It should be noted that image information or font information related to the drawing commands 0, 1, and so on is stored, and is used for executing the drawing process. Drawing data for all of the image area in the print area is specified by drawing commands that construct print data in the format described above.

The drawing process specified by drawing commands analyzed in S102 is executed in the flowchart of the image outputting process shown in FIG. 3, and after commanding whether or not outputting of image data is unnecessary by a user operation, the printer system control unit 104 has the print data analyzing/drawing unit 105 execute the drawing process in the operating mode chosen by the command.

Regarding the processing step, since drawing commands are processed one by one, the printer system control unit 104 firstly determines whether or not the target drawing command is an image (S103). If the target drawing command is not an image (NO in S103), the printer system control unit 104 has the print data analyzing/drawing unit 105 execute the drawing process specified by the drawing command (S105).

If the target drawing command is an image (YES in S103), the printer system control unit 104 subsequently determines whether or not to draw images from the operating mode selected by a user (S104). Since the printer system control unit 104 manages print jobs generated by received print data and instruction from a user that chooses drawing/not drawing images by detecting via the control panel I/F 17 as information necessary for processing print jobs, the printer system control unit 104 can determine the instruction is whether or not drawing images by referring to the managed information.

Figure 5:
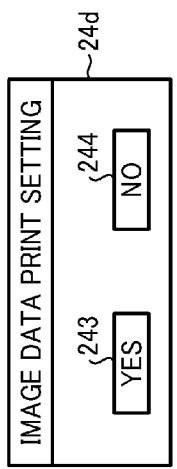
FIG. 5 is a diagram illustrating a display to choose yes or no for drawing images on a control panel of the printer in the first embodiment of the present invention.

FIG. 5 illustrates an example of a dialog box 24d on which yes or no is chosen for drawing images by a user on the control panel 24 of the printer in this embodiment. The dialog box 24d in FIG. 5 is titled "IMAGE DATA PRINT SETTING" and includes a "YES" button 243 and a "NO" button 244. The printer system control unit 104 accepts the user instruction that chooses whether or not an image is drawn by detecting the user operation of those buttons.

If not drawing images is chosen for the image drawing command in S104 (YES in S104), the printer system control unit 104 goes on to a process for the next target drawing command from S103 without executing the drawing. Alternatively, if drawing images is chosen for the image drawing command in S104 (NO in S104), the printer system control unit 104 sends the drawing command to the drawing unit of the print data analyzing/drawing unit 105 to execute the drawing process. After receiving the drawing command, the drawing unit of the print data analyzing/drawing unit 105 executes the drawing process in response to the received drawing command (S105). This process flow is finished after finishing executing the drawing process for all of drawing commands.

Figure 6:
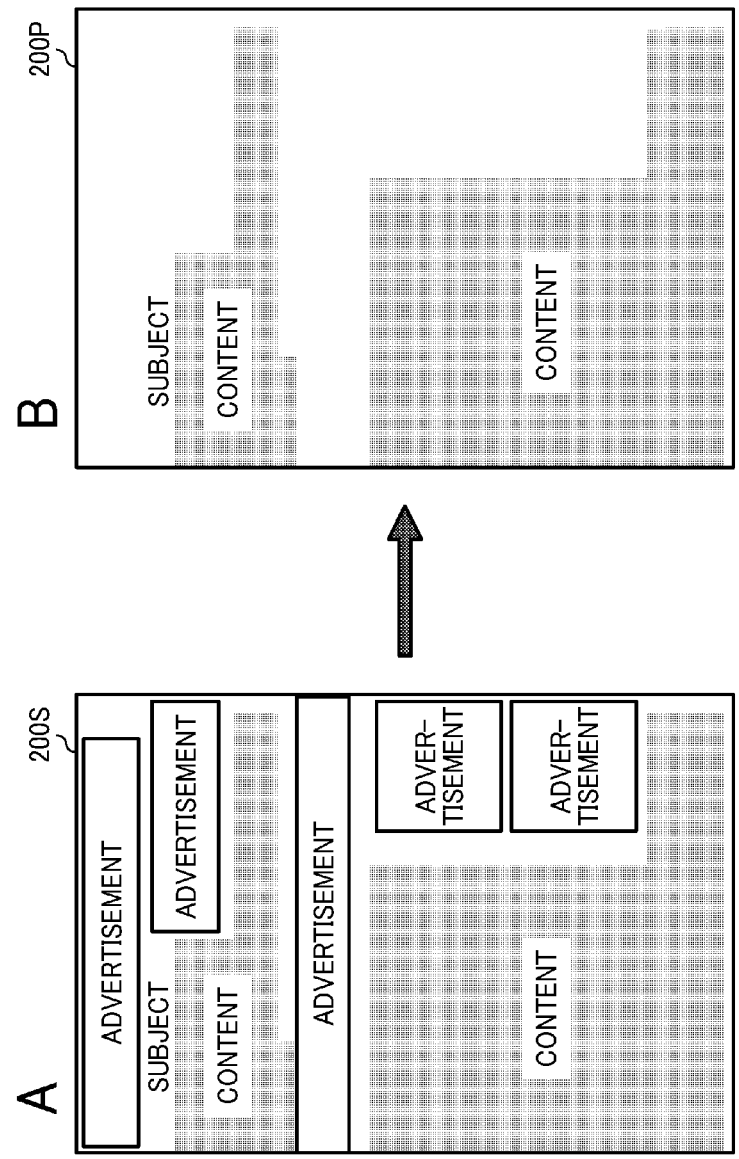
FIG. 6 is a diagram illustrating a result of a drawing process that does not draw image data in print data to be processed on the printer in the first embodiment of the present invention.

FIG. 6 is a diagram illustrating a result of the drawing process that does not draw image data for print data to be processed on the printer of the first embodiment. FIG. 6A illustrates an example of data contents of print data 200S, in which the data contents consist of images in "advertisement" fields and strings in other fields. Since "advertisement" fields in the print data 200S are images and not drawn when the operating mode in which image drawing commands are not executed is applied, all of the rectangular areas of the "advertisement" fields become blank areas in an image 200P that shows the result of the printing process in FIG. 6B.

As described above, if a user does not need images such as advertisements in web pages, the image outputting process of the printer 20 in this embodiment enables the user to print out necessary text information eliminating image information which is noise for the user and to cut waste of resources and electricity to print out unnecessary image information by executing printing out in the operating mode in which image drawing commands are not executed.

Second Embodiment

While image areas become rectangular blank areas in case the operating mode in which image data is not drawn is chosen in the first embodiment described above, a process that fills these blank areas with other elements (hereinafter referred to as "blank repairing process") is added for user convenience in the second embodiment described below. In the image outputting process of the printer in this embodiment, based on the premise of having text drawing commands in print data, the print data is printed out after rearranging text images to fill the blank areas with text images in units of text lines and repair the blank areas.

Figure 7:
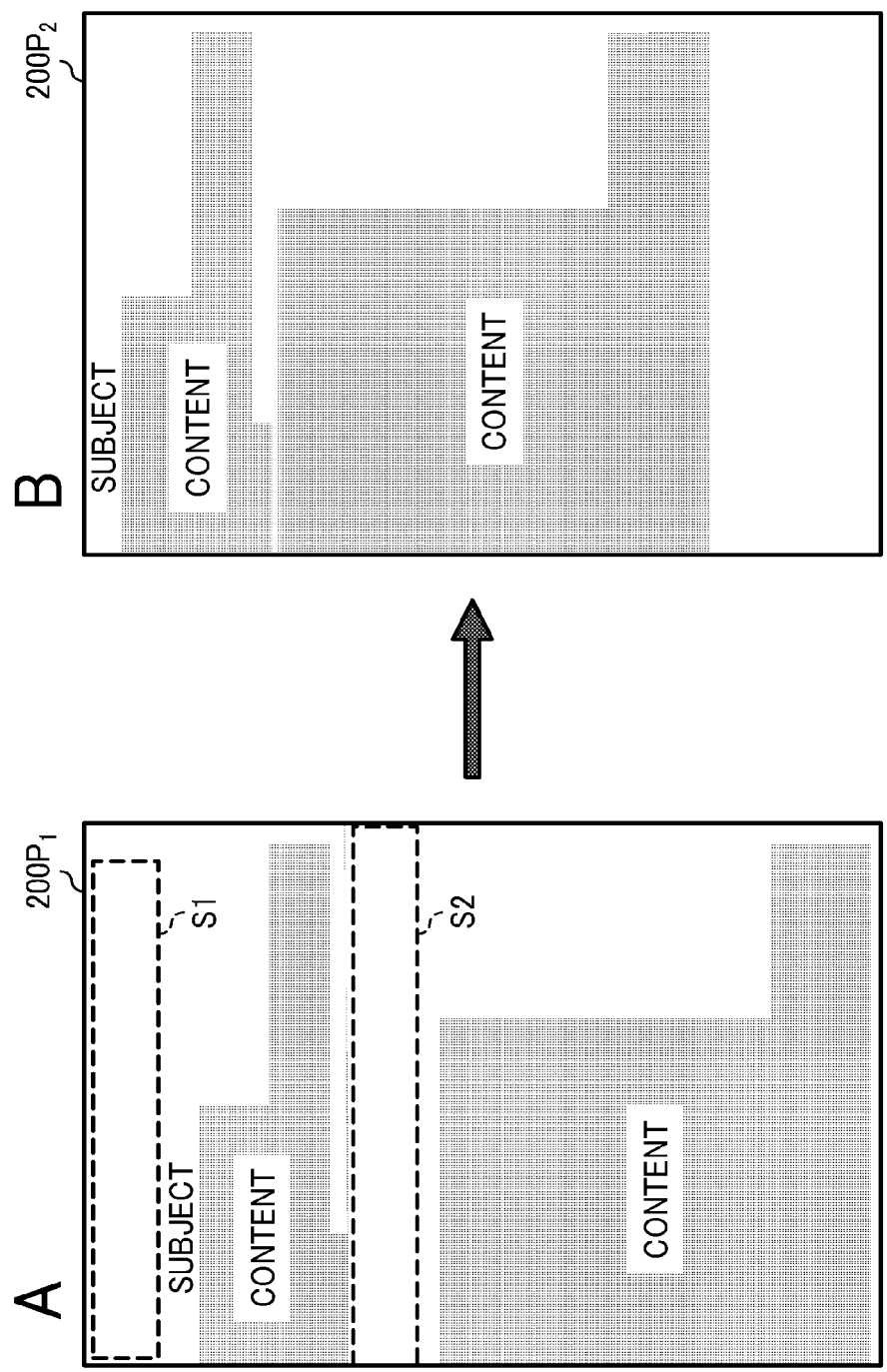
FIG. 7 is a diagram illustrating layout of text that fills a blank generated by not drawing image data with strings in units of strings on a printer in a second embodiment of the present invention.

FIG. 7 is a diagram illustrating layout of text that fills blank generated by not drawing image data with strings in units of lines on the printer of the second embodiment. FIG. 7A illustrates an image $200P_1$, the processing result of print data in case the operating mode in which image drawing command is not executed is applied as in FIG. 6B. In the image $2000P_1$, areas where images were originally drawn become blank areas.

Among blank areas in the image $200P_1$ in FIG. 7A, areas S1 and S2 are blank areas in units of text lines. Considering readability, it is better to fill these blank areas in with units of text lines S1 and S2 instead of leaving them blank. Therefore, these blank areas in units of text lines are filled up by moving forward subsequent strings in units of text lines. FIG. 7B illustrates an image of print area $200P_2$ as the result of the process described above. As shown in FIG. 7B, blank areas with a size in units of text lines S1 and S2 in FIG. 7A disappear by filling in the image area with the next strings in units of text lines. Readability can be improved by adding this process described above as shown in FIG. 7B.

Figure 8:
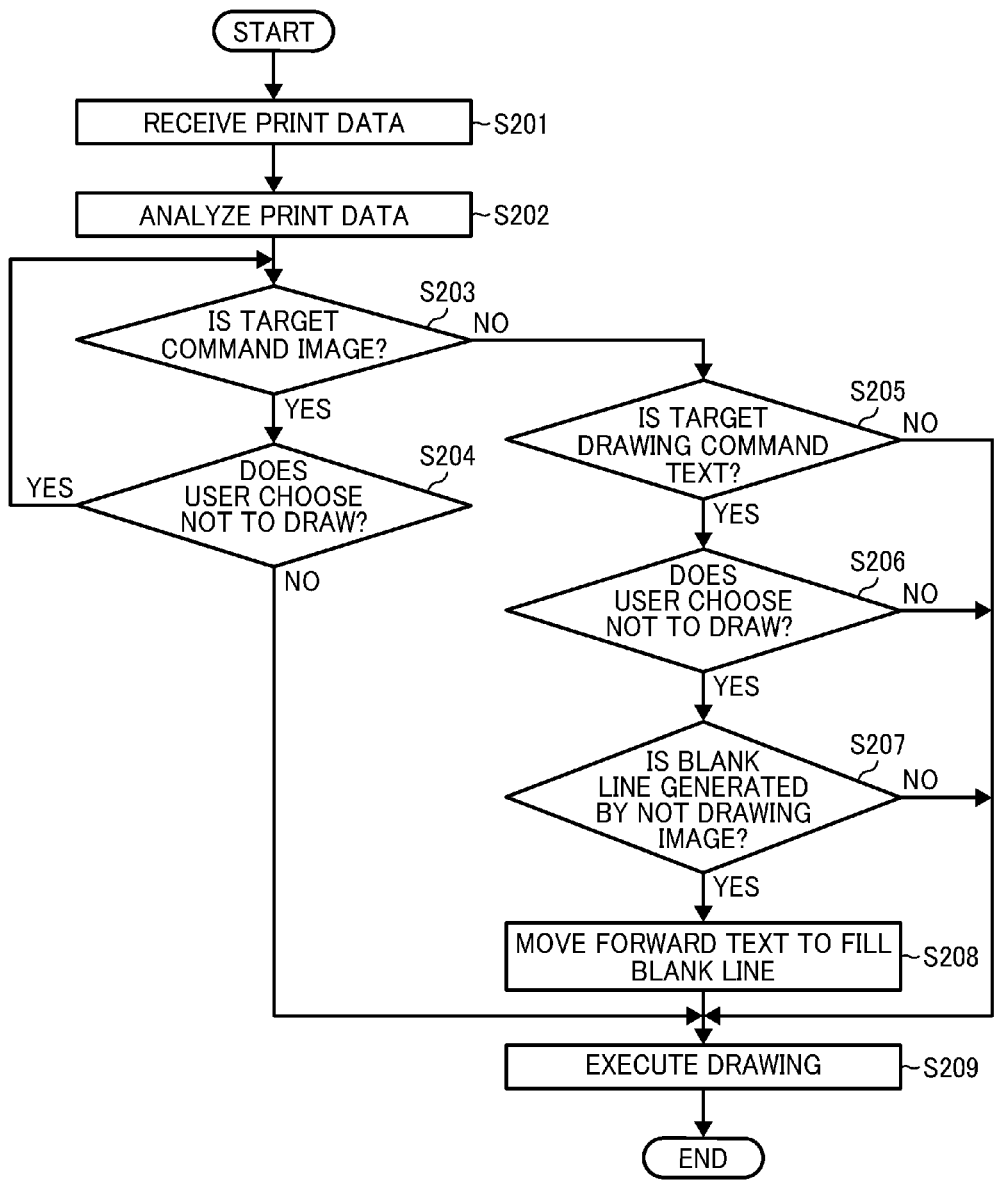
FIG. 8 is a flowchart illustrating an image outputting process on the printer in the second embodiment of the present invention in the operating mode in which image data is not drawn.

FIG. 8 is a flowchart illustrating image an outputting process on the printer of second embodiment in the operating mode in which image data is not drawn. It should be noted that steps from S201 to S204 in FIG. 8 correspond to steps from S101 to S104 in FIG. 3 and the same process is executed in each step, so those descriptions are omitted here. In the flowchart that shows the image outputting process for the printer of the second embodiment in FIG. 8, after determining whether or not drawing command acquired by analyzing print data is an image, the printer system control unit 104 executes process in response to user's choice of drawing/not drawing images as the same steps as image outputting process of the printer in the first embodiment as shown in FIG. 3 if the target drawing command is an image (S203, S204, and S209).

If the target drawing command is not an image in S203 (NO in S203), the printer system subsequently determines whether or not the target drawing command is text (S205). After the determination in S205, if the target drawing command is not text (NO in S205), the printer system control unit 104 goes on to the drawing process in S209 instead of executing any additional process since the drawing command is not targeted for the blank repairing process added in the image outputting process of the printer in this embodiment. Alternatively, if the target drawing command is text (YES in S205), the printer system control unit 104 subsequently determines whether or not the operating mode in which image is not drawn is chosen (S206). If not drawing images is not chosen in S206 (NO in S206), the printer system control unit 104 immediately goes on to step of the drawing process for the target text command in S209 instead of executing any additional process since no blank area is generated due to not drawing images and no repairing process is necessary.

If not drawing images is chosen in S206 (YES in S206), since the repairing process for blank areas generated by not drawing images is necessary, the printer system control unit 104 subsequently determines whether or not the blank area generated in a previous area of text images drawn by the target drawing command is a blank area in units of text lines (S207).

After the determination in S207, if the blank area generated in the previous area of the text image is not a blank area in units of text lines where text lines can be stored (NO in S207), the printer system control unit 104 goes on to step of the drawing process for the target text command in S209 instead of executing the repairing process, since the blank area cannot be repaired by the text image.

Alternatively, after the determination in S207, if the blank area generated in previous area of text image is a blank area in units of text lines where text lines can be stored (YES in S207), the printer system control unit 104 subsequently executes a process for repairing the blank area for the target text command (S208). This process moves forward the target text image to fill the blank area generated in the previous area with the next strings in units of text lines. More specifically, the printer system control unit 104 changes Y coordinate value of the drawing command for the target text located just behind the blank area generated in units of text lines for the number of text lines to be moved forward. The changed drawing command is used for the drawing process. It should be noted that the result without generating blank areas in units of lines as shown in FIG. 7B can be acquired by repeating this arrangement (moving forward process) on text drawing commands to the bottom line sequentially. After executing the processes described above, the drawing unit of the print data analyzing/drawing unit 105 executes the drawing process in response to the received drawing command (S209). After executing the drawing process for all of drawing commands, this process flow finishes. As described above, images in print area can be converted into a more readable document by filling the blank areas S1 and S2 shown in FIG. 7A with the next strings in units of lines and repairing the blanks in addition to the image outputting process of the printer in first embodiment.

Third Embodiment

Image outputting process of the printer in the third embodiment is basically the same as that in the second embodiment, except that in the third embodiment blank areas are filled with text images in units of characters or strings (hereinafter referred to as "strings") and repaired instead of filling blank areas with text images in units of text lines and repairing. It should be noted that the image outputting process of the printer in the third embodiment is premised on applying the image outputting process of the printer in the second embodiment.

Figure 9:
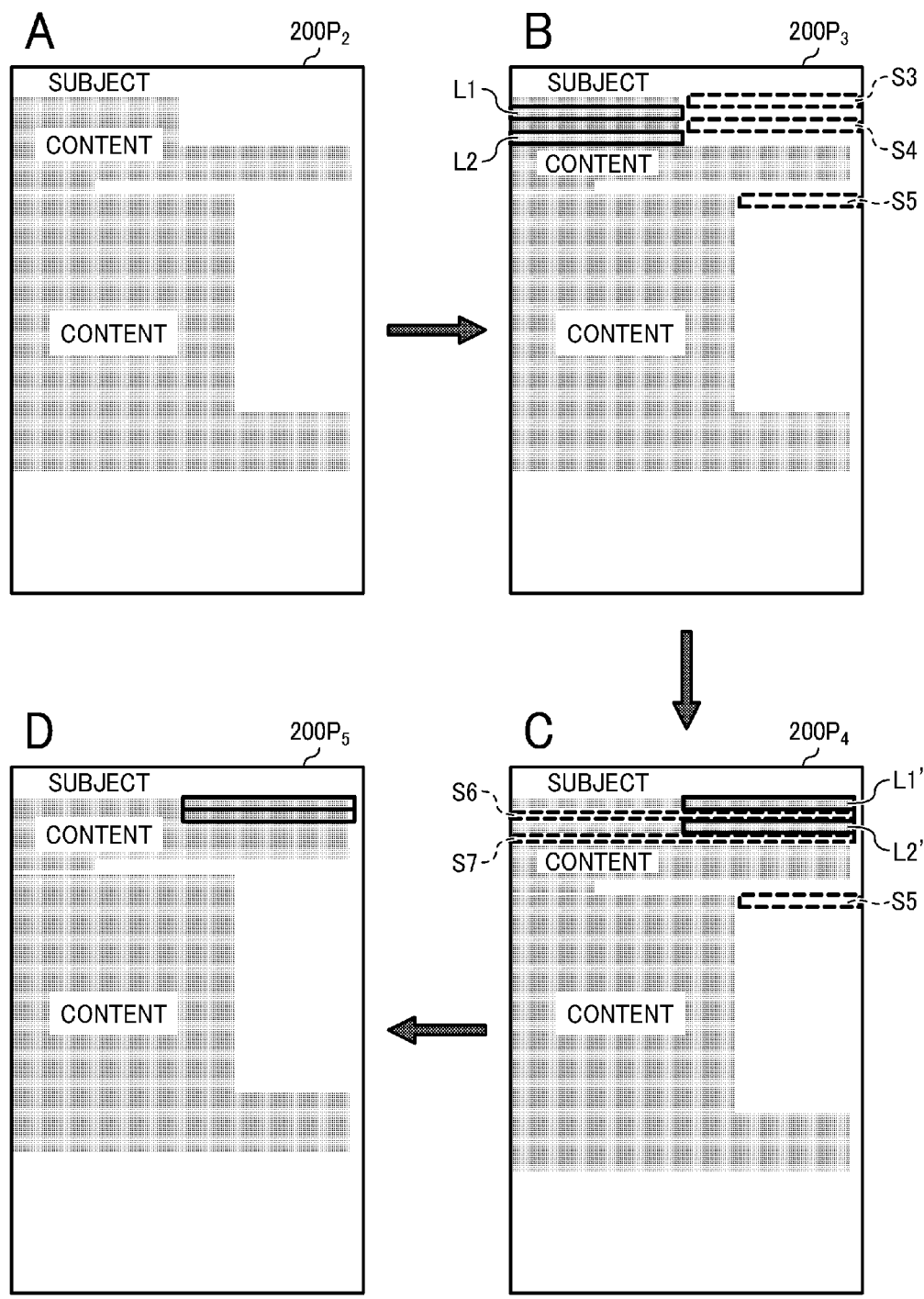
FIG. 9 is a diagram illustrating layout of text that fills a blank generated by not drawing image data in units of strings on a printer in a third embodiment of the present invention.

FIG. 9 is a diagram illustrating layout of text images that fill blank areas generated by not drawing image data with units of strings in the image outputting process of the printer in the third embodiment. FIG. 9A illustrates an image $200P_2$, the processing result of print data in case the operating mode in which image drawing command is not executed is applied the same as in FIG. 7B. In the image $200P_2$, while blank areas in units of text lines disappear due to the image outputting process of the printer in the second embodiment, other blank areas still exist.

Among blank areas in the image $200P_2$ shown in FIG. 9A, blank areas in units of strings that are targets for blank repairing process in the image outputting process of the printer in the third embodiment are blank areas S3 and S4 in an image $200P_3$ shown in FIG. 9B. If there are strings in the same line as S3 and S4 and there are strings L1 and L2 that can be combined with them as one sentence in next areas, readability can be improved by filling blank areas S3 and S4 by connecting L1 and L2 to the strings located in the previous lines instead of leaving S3 and S4 blank. Therefore, the next string L1 is moved forward so that the string in the same line of the blank area S3 can be connected to the string L1 as one sentence and the blank area S3 in units of strings is filled and repaired. Likewise, the next string L2 is moved forward so that the string in the same line of the blank area S4 can be connected to the string L2 as one sentence and the blank area S4 in units of strings is filled and repaired. FIG. 9C and FIG. 9D illustrate this blank repairing process. FIG. 9C illustrates a print area image $200P_4$ acquired after filling the blank area in units of strings S3 with a string L1' by moving forward the next string L1 and filling the blank area in units of strings S4 with a string L2' by moving forward the next string L2.

It should be noted that the image outputting process of the printer in the third embodiment, the moving forward process is executed if, for instance, the blank area S3 in the image $200P_3$ shown in FIG. 9B is longer than the next strings L1, that is, the next line becomes blank after executing the moving forward process. Therefore, the moving forward process is executed for the blank area S3 and S4, but the moving forward process is not executed for a blank area S5 in the image $200P_3$ since the condition described above is not satisfied (the blank area S5 is shorter than the next strings).

Also, after filling the blank area in units of strings S3 with the string L1' by moving forward the next string L1, the lines where the string L1 and L2 used to exist become blank areas S6 and S7 in the image $200P_4$ as shown in FIG. 9C. Therefore, the same process as S208 (shown in FIG. 8) in the second embodiment is executed for the blank areas S6 and S7 to eliminate those blank areas in units of lines. FIG. 9D illustrates a print image $200P_4$ after executing the filling process described above. As shown in FIG. 9D, both of the blank areas in units of lines S6 and S7 in the image $200P_4$ in FIG. 9C disappear by filling them with the next strings in units of lines. As a result, the intended readable print image $200P_5$ can be acquired after executing processes described above.

Figure 10:
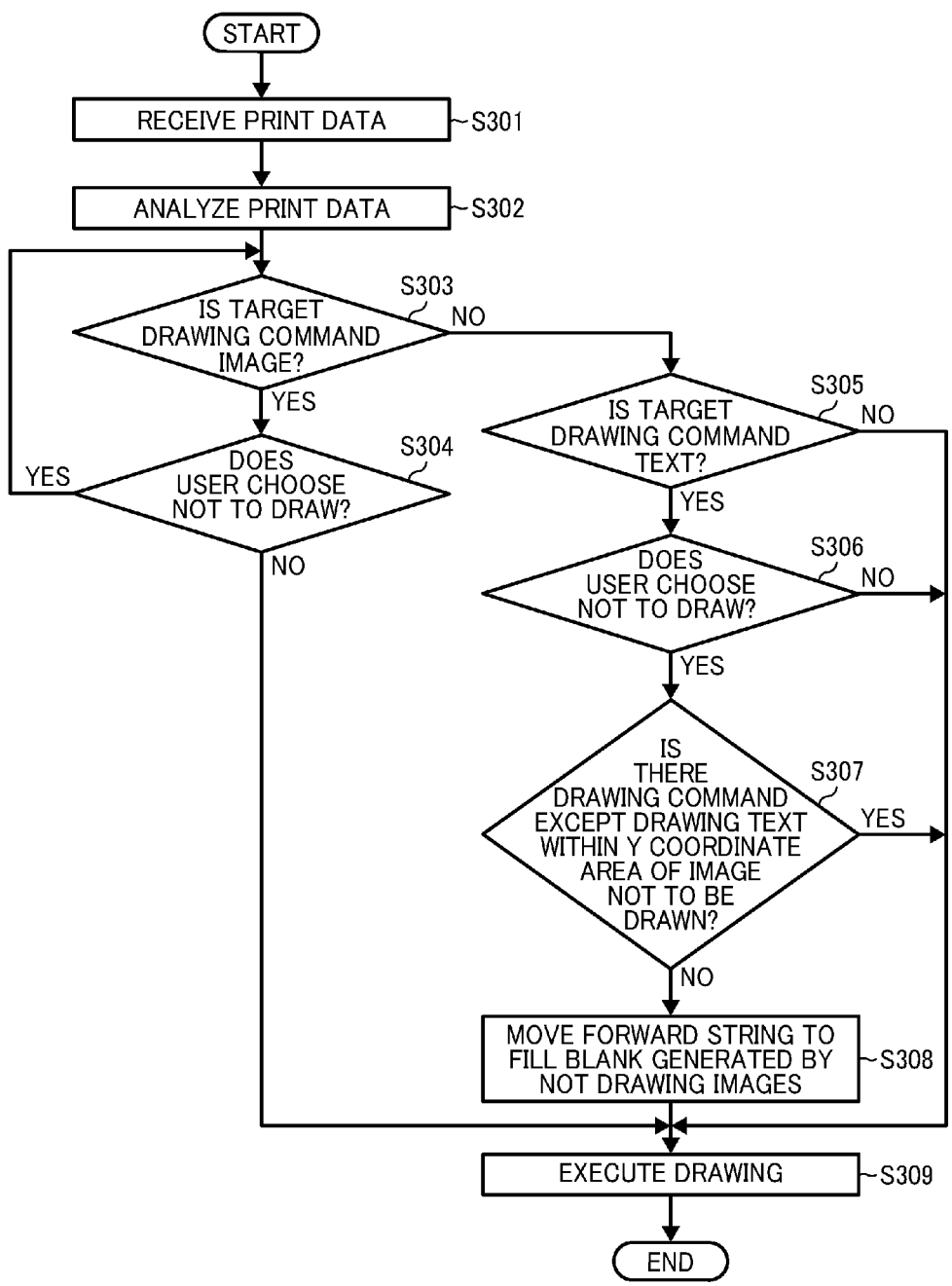
FIG. 10 is a flowchart illustrating an image outputting process on the printer in the third embodiment of the present invention in the operating mode in which image data is not drawn.

FIG. 10 is a flowchart illustrating the image outputting process on the printer in the third embodiment in the operating mode in which image data is not drawn. It should be noted that steps from S301 to S306 in FIG. 10 correspond to steps from S201 to S206 in FIG. 8 and the same process is executed in each step, so those descriptions are omitted here. In the flowchart that shows the image outputting process for the printer of the third embodiment in FIG. 10, after determining whether or not drawing command acquired by analyzing print data is an image, the printer system control unit 104 executes process in response to user's choice of drawing/not drawing images as the same steps as the image outputting process of the printer 20 in the second embodiment as shown in FIG. 8 if the target drawing command is an image (S303, S304, and S309). If the target drawing command is neither an image (NO in S303) nor text (NO in S305), the printer system control unit 104 goes on to the drawing process in S309 instead of executing any addition process since the drawing command is not the target for the blank repairing process added in the image outputting process of the printer in the third embodiment. Alternatively, if the target drawing command is text (YES in S305) and drawing images is not chosen by a user (NO in S306), the printer system control unit 104 immediately goes on to step of drawing process for the target text command in S309 instead of executing any additional process, since no blank area is generated due to not drawing images and no repairing process is necessary.

If not drawing images is chosen by the user in S306 (YES in S306), since repairing process for blank areas generated by not drawing images is necessary, the printer system control unit 104 subsequently determines whether or not there is a target drawing command for other than text within Y coordinate of the drawing area specified by the drawing command of image which is not drawn (S307). After the determination in S307, if there is a target drawing command for other than text within Y coordinate area of the drawing area specified by the drawing command of image (YES in S307), and the printer system control unit 104 goes on to the step of the drawing process for the target text command in S309 instead of executing the repairing process since the blank repairing process is not executed within the Y coordinate area.

Alternatively, after the determination in S307, if there is no target drawing command for other than text within the Y coordinate area of the drawing area specified by the drawing command of image (NO in S307), the printer system control unit 104 subsequently executes the process for repairing the blank area for the target text command (S308). This process moves forward the target text image to fill the blank area generated in the previous area with the next strings in units of text lines. More specifically, the printer system control unit 104 changes top X and Y coordinate values of the drawing command for the target text located just behind the blank area generated in units of text lines into top of X and Y coordinate values of the area specified by the drawing command for image which is not drawn, and changes end X and Y coordinate values of the drawing command for the target text located just behind the blank area generated in units of text lines into X and Y coordinate values adding the area size of strings to be moved forward (e.g., the string L1 or L2 in FIG. 9B) to the top X and Y coordinate values of the area specified by drawing command for image which is not drawn. The changed drawing command is used for the drawing process.

It should be noted that the lines where the string moved forward used to exist become a blank area after executing the moving forward process described above. Therefore, the same process as S208 (shown in FIG. 8) in the second embodiment is executed for the newly generated blank area in units of text lines to eliminate the blank area in units of text lines and acquire the result as shown in FIG. 9D. After executing processes described above, the drawing unit of the print data analyzing/drawing unit 105 executes the drawing process in response to the received drawing command (S309). After executing drawing processes for all of drawing commands, this process flow finishes.

As described above, images of print area can be converted into a more readable document by filling the blank areas in units of strings S3 and S4 shown in FIG. 9B with the next strings L1 and L2 and eliminating the newly generated blank areas in units of strings S6 and S7 in addition to the image outputting process of the printer in the first embodiment and the image outputting process of the printer in the second embodiment that eliminates blank areas by filling the blank areas S1 and S2 shown in FIG. 7A with the next strings in units of text lines.

Fourth Embodiment

The image outputting process of the printer in the fourth embodiment is basically the same as the image outputting process of the printer in the third embodiment that executes the blank repairing process in units of strings. However, while the previous strings and the strings moved forward to fill the blank area are formerly combined into one sentence, they do not always construct a meaningful sentence. Therefore, if the compiled strings do not construct a sentence, it can be recognized that they are compiled into one string by placing a mark as an identifier at the end of the combined string to be able to recognize a delimiter. In the fourth embodiment, a symbol "•" is used for the delimiter since the delimiter should not change the content of the sentence regardless of whether or not compiled strings construct a sentence.

Figure 11:
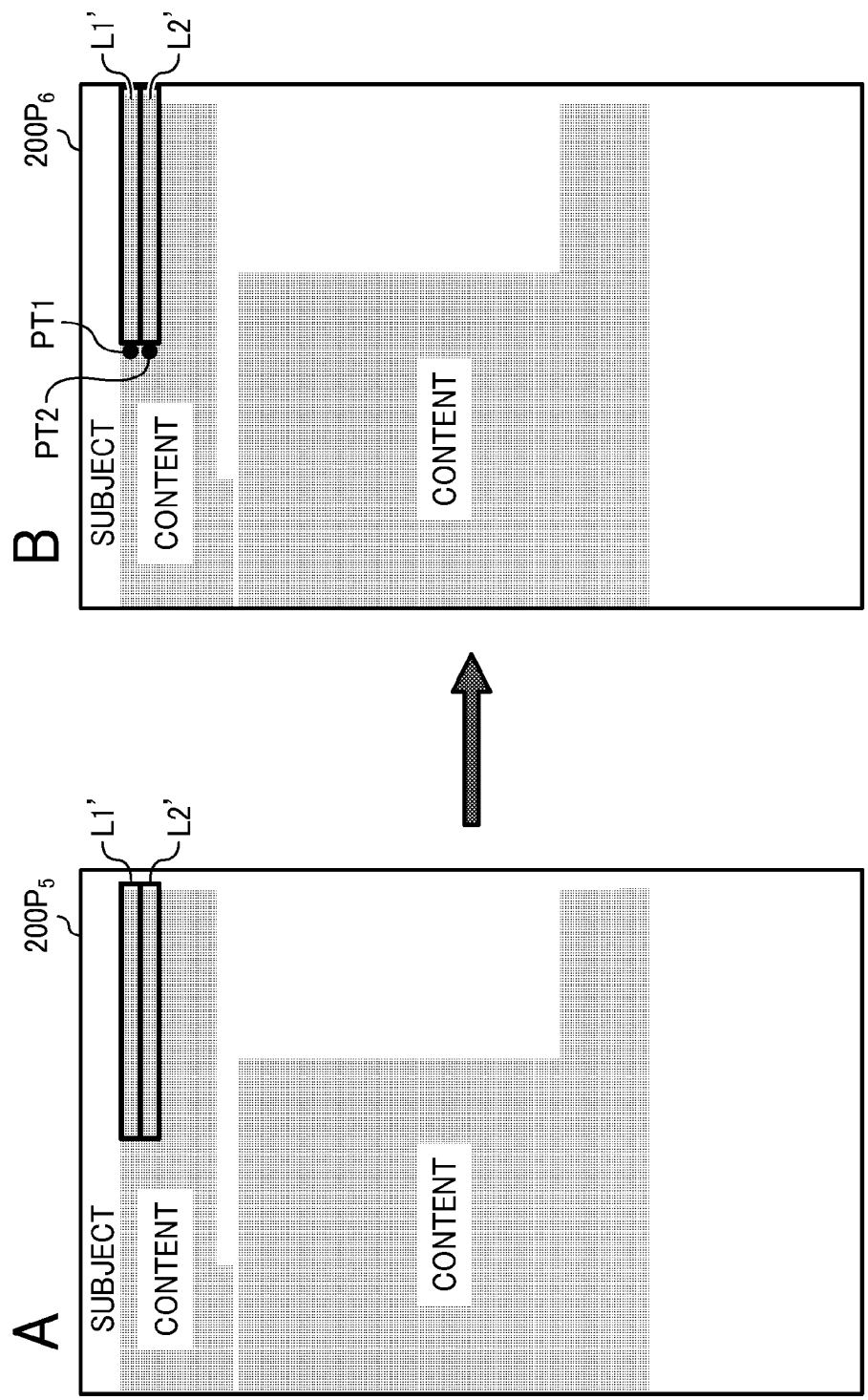
FIG. 11 is a diagram illustrating layout of text that fills a blank generated by not drawing image data of an image outputting process and added marks in a fourth embodiment of the present invention.

FIG. 11 is a diagram illustrating layout of text images that fill blanks generated by not drawing image data of the image outputting process and added marks in the fourth embodiment. FIG. 11A illustrates the image $200P_5$ the same as that shown in FIG. 9D. In the image $200P_5$, many of blank areas generated in areas where originally images were drawn are repaired except blank areas in which the moving forward process in units of strings cannot be executed.

In the image $200P_5$, the blank repairing process in units of strings took place at the area of the string L1' and L2' filled by moving forward the next strings L1 and L2 (as shown in FIG. 9B). In the image outputting process in the third embodiment described above, the strings L1' and L2' are directly connected to the end of previous strings, and breaks of the sentences cannot be determined. Therefore, in the fourth embodiment, those strings are connected via the marks "•" PT1 and PT2 as shown in an image $200P_6$ in FIG. 11B. A user can easily understand a sentence by inserting the mark "•" if the sentence is separated between connected strings.

Figure 12:
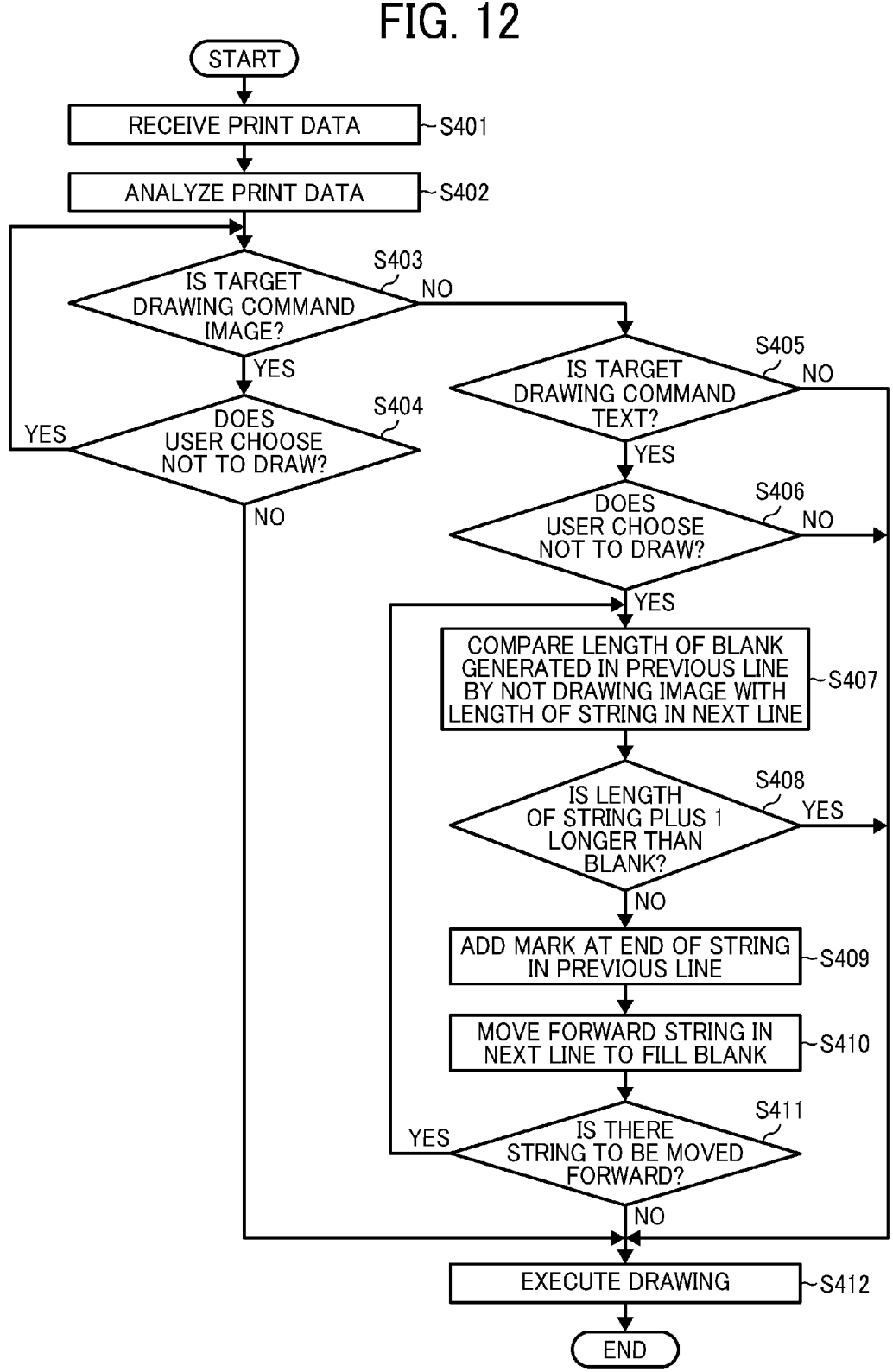
FIG. 12 is a flowchart illustrating the image outputting process on the printer in the fourth embodiment of the present invention in the operating mode in which image data is not drawn.

FIG. 12 is a flowchart that illustrates the image outputting process on the printer in the fourth embodiment in the operating mode in which image data is not drawn. It should be noted that steps from S401 to S406 in FIG. 12 correspond to steps from S301 to S306 in FIG. 10 and the same process is executed in each step, so those descriptions are omitted here. In the flowchart that shows image outputting process for the printer of the fourth embodiment in FIG. 12, after determining whether or not drawing command acquired by analyzing print data is image, the printer system control unit 104 executes a process in response to user's choice of either drawing images or not drawing images as the same steps as the image outputting process in the third embodiment if the target drawing command is an image (S403, S404, and S412). If the target drawing command is text (YES in S405) and drawing images is not chosen by a user (YES in S406), the printer system control unit 104 subsequently compares the length of the blank area generated by not drawing images with the length of the next string that is to be moved forward based on information on the drawing area specified by the drawing command (S407) since the blank repairing process is necessary due to not drawing images. It should be noted that the length of strings moved forward is compared after adding one character as a mark "•" added at the end of the previous string.

After determining in S407, if the length of strings moved forward plus 1 is longer than the length of the blank area generated by not drawing images (YES in S408), the printer system control unit 104 goes on to step of drawing process for the target text command in S412 instead of executing the repairing process since this string is not the target for the blank repairing process. Alternatively, if the length of strings moved forward plus 1 is shorter than the length of the blank area generated by not drawing images (NO in S408), the printer system control unit 104 goes on to the blank repairing process that targets text commands etc.

In the blank repairing process, first, the mark "•" is added at the end of the previous string (S409). Subsequently, the printer system control unit 104 changes the drawing command so that the string is moved forward just after the mark "•" added in S409 (S410). It should be noted that this moving forward process for string is the same as the described image outputting process on the printer in the third embodiment.

Next, the printer system control unit 104 determines whether or not there is string not processed yet in the strings in the target line since the blank repairing process by moving forward is executed in units of strings (S411). After determining that all of processes for the target string are finished, the printer system control unit 104 passes the drawing command indicating which the blank repairing process was executed to the drawing unit of the print data analyzing/drawing unit 105. The drawing unit of the print data analyzing/drawing unit 105 executes drawing process in response to the received drawing command (S412). After executing the drawing process for all of drawing commands, this process flow finishes.

As described above, print image can be converted into an even more readable document by adding the mark between the destination string and the strings moved forward in units of strings as shown in FIG. 11 in the blank repairing process on the printer in the fourth embodiment in addition to the image outputting process of the printer in the third embodiment since a user can recognize the sentence easier compared to compiling the strings without adding the mark in case the sentence is separated between the compiled strings.

Fifth Embodiment

In the image outputting process of the printer 20 in the fifth embodiment, a user chooses either drawing images or not drawing images. In case image data is sandwiched between string lines comprising text data in drawing commands specified in the print data, the drawing process on the image data is executed as an exception even if the user chooses not drawing images.

Figure 13:
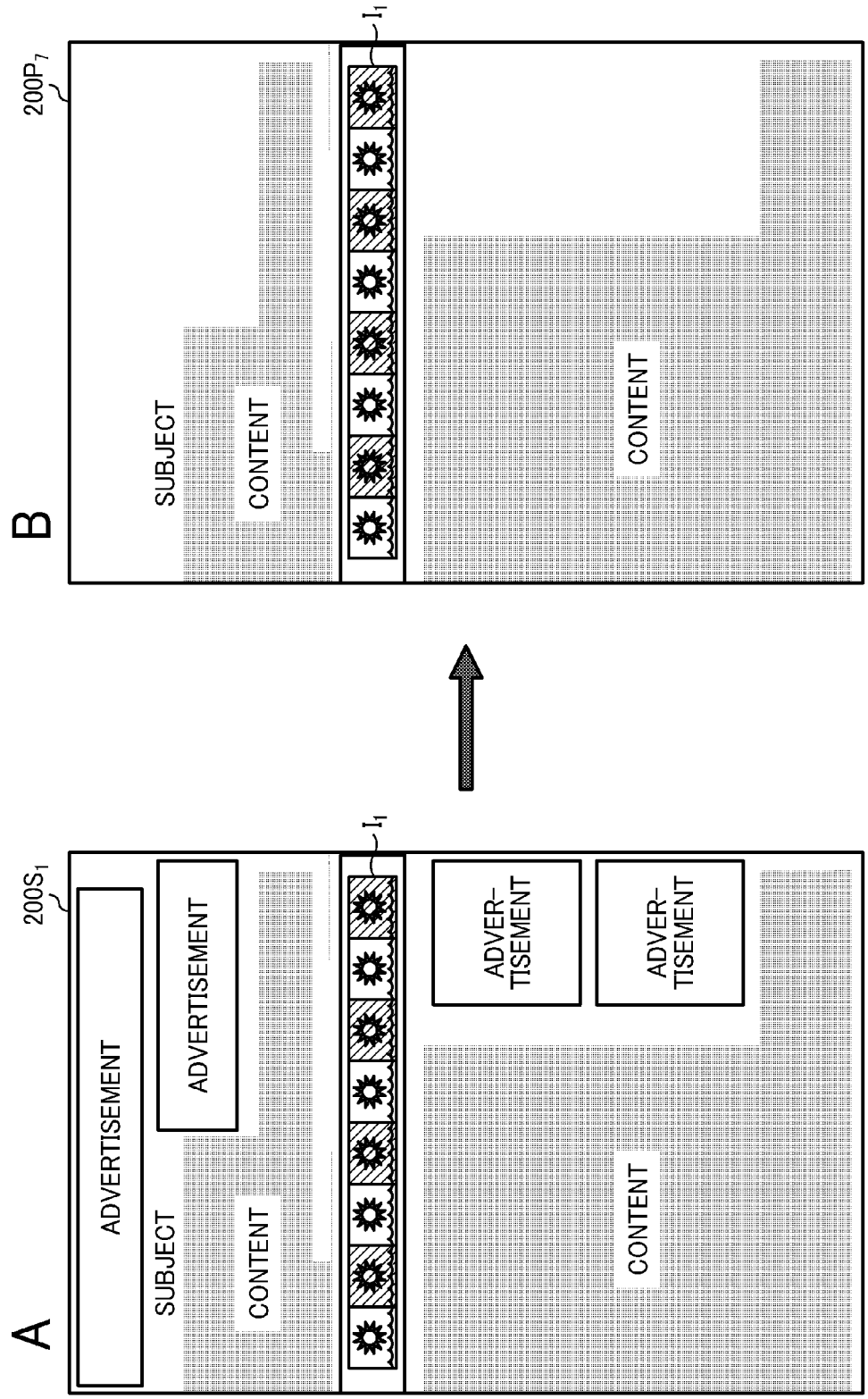
FIG. 13 is a diagram illustrating an exceptional process in the operating mode in which image data is not drawn in an image outputting process on a printer in a fifth embodiment of the present invention.

FIG. 13 is a diagram illustrating an exceptional process in the operating mode in which image data is not drawn in the image outputting process on the printer in the fifth embodiment. FIG. 13A illustrates drawing data specified in print data that satisfies the condition of the exceptional drawing command described above. That is, image data $I_1$ is located in the drawing command specified in the print data with being sandwiched between the previous text line that at least partially has a string and the next text line that at least partially has a string as shown in the image 200S$_1$ in FIG. 13A.

It should be noted that it can be added to the condition that the image data $I_1$ is spread over the full width of the print area as shown in the image 200S$_1$ in FIG. 13A. If the image data $I_1$ is located as shown in the image 200S$_1$, it is highly possible that the image data $I_1$ is closely related to the content of the article of the text data. Therefore, the image data $I_1$ can be distinguished from other images whose contents are advertisements in the image 200S$_1$ by the difference in the layout condition as described above.

Assuming the layout condition of images described above, images that are closely related to content of articles are output as an exception distinguishable from images whose contents are advertisements even if the operating mode in which image is not drawn is chosen. FIG. 13B illustrates an image 200P$_7$ as the result of applying the exception described above in the operating mode in which image drawing commands are not executed with the print data shown in FIG. 13A. In the image 200P$_7$ in FIG. 13B, the image data $I_1$ spread over the full width of the print area is drawn since it satisfies the layout condition for the exception while all other areas where originally images were to be drawn become blank.

Figure 14:
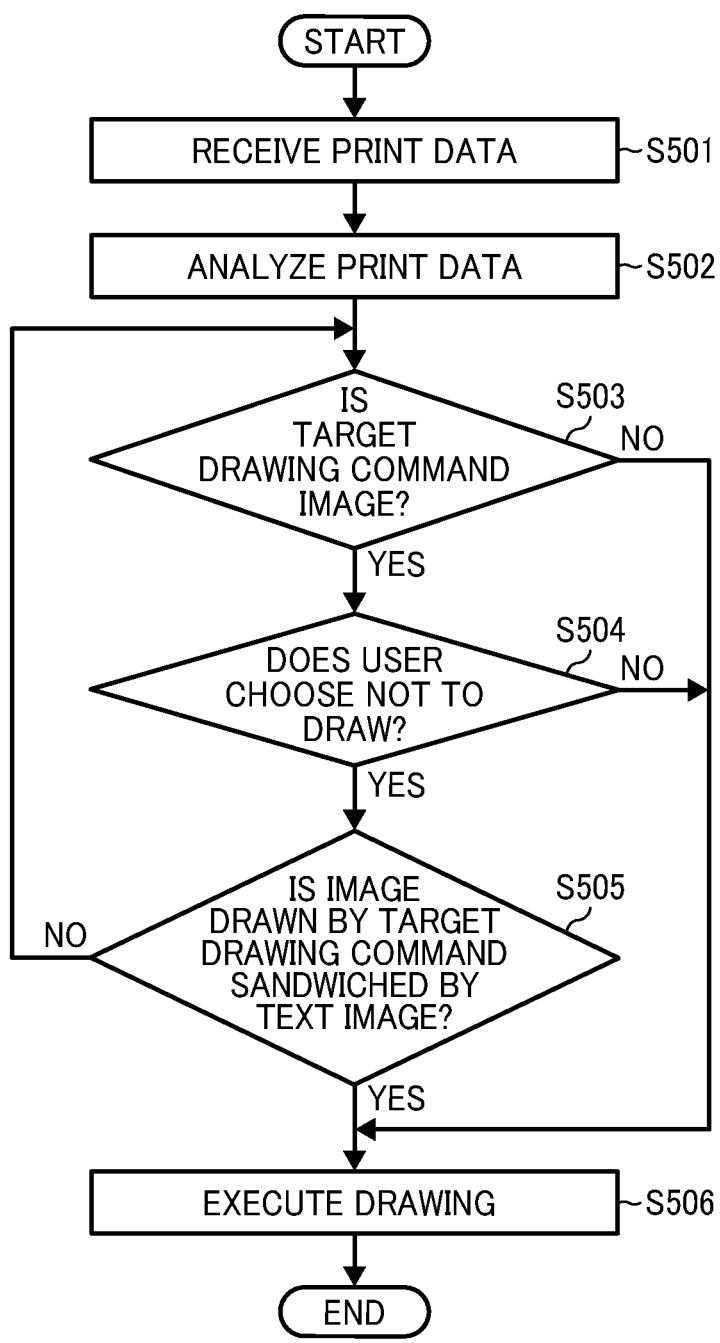
FIG. 14 is a flowchart illustrating the image outputting process on the printer in the fifth embodiment of the present invention in the operating mode in which image data is not drawn.

FIG. 14 is a flowchart illustrating the image outputting process on the printer in the fifth embodiment in the operating mode in which image data is not drawn. It should be noted that steps from S501 to S504 in FIG. 14 correspond to steps from S101 to S104 in FIG. 3 and the same process is executed in each step, so those descriptions are omitted here. In the flowchart that shows the image outputting process for the printer 20 of the fifth embodiment in FIG. 14, the same as in the flowchart of the image outputting process on the printer of the first embodiment (FIG. 3), after determining whether or not drawing command acquired by analyzing print data is image, the printer system control unit 104 executes a process in response to user's choice of either drawing images or not drawing images as the same steps as the image outputting process in the first embodiment if the target drawing command is an image (S503, S504, and S506)

If not drawing image is not chosen by a user (NO in S504), the printer system control unit 104 passes the drawing command to the drawing unit of the print data analyzing/drawing unit 105 to execute the drawing process on this drawing command. Alternatively, if not drawing image is chosen by a user (YES in S504), the printer system control unit 104 determines depending on whether or not the target image in the image outputting process on the printer 20 in the fifth embodiment is sandwiched by text lines that have text images (S505).

In S505, if the printer system control unit 104 does not determine that the image drawn by the image drawing command is sandwiched by text lines that have text images (NO in S505), the printer system control unit 104 goes on to the process from S503 for the next drawing command which has not been processed yet instead of executing the drawing process for the drawing command. Alternatively, in S505, if the printer system control unit 104 determines that the image drawn by the image drawing command is sandwiched by text lines that have text images (YES in S505), the printer system control unit 104 passes the drawing command to the drawing unit of the print data analyzing/drawing unit 105 to execute the drawing process for the image drawing command since the exception can be applied to this process. The drawing unit of the print data analyzing/drawing unit 105 executes the drawing process in response to the received drawing command (S506). After executing drawing process for all of drawing commands, this process flow finishes.

As described above, in the image outputting process on the printer in the fifth embodiment, content of article represented by text images can be more precisely and easily recognized than by the image outputting process on the printer in the first embodiment by drawing images whose chances are high to be closely related to the content of the article represented by text data as the exception even if a user chooses the operating mode in which images are not drawn in case the user does not need images of advertisements etc. in web pages.

Support for Input Data from Scanner

In the image outputting process on the printer in the first to the fifth embodiments, it is assumed that input print data is PDL data. However, image forming apparatuses sometimes accept print data in the form of image data generated based on pixel brightness signals acquired by scanning a paper document on which images are printed. In case of input data from a scanner, analyzing drawing commands which is necessary in the process of generating image data for printout from PDL data is not executed. That is, area information for images is not detected as an indispensable process for printout by using input data from a scanner. Therefore, it is necessary to add a process that detects area information of images in order to control an output process that selects whether or not printing out of images is executed on input data from a scanner.

An image area separating method that optionally improves the quality of output images is known as one method for detecting area information that corresponds to images on input data from a scanner. This method separates photo images that correspond to images from images of text and ruled lines, etc. Therefore, an output process that selects whether or not an image is printed out can be controlled by implementing the image area separating method described above instead of implementing the print data analyzing method in the first to the fifth embodiments described above and applying the image area separating method in the printing out process in which image output for image data is unnecessary.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An image forming apparatus, comprising:
   an acceptance unit configured to accept an image not to be printed, wherein the image not to be printed is selected from a plurality of images and text contents located in a printing area of print data; and
   a control unit configured to only print the print data of the plurality of images that were not selected by the acceptance unit,
   wherein the control unit is configured not to print and output the print data of the selected image when the selected image is not sandwiched between a last text line of a first text content and a first text line of a second text content of the print data, and to print and output the print data of the selected image when the selected image is sandwiched between the last text line of the first text content and the first text line of the second text content of the print data.

2. The image forming apparatus according to claim 1, wherein, when the image data is sandwiched by text lines comprising text data, the control unit executes an override drawing process for the image data that draws the image even if the output command receiving unit receives the command indicating that printing out of the image data is unnecessary.

3. The image forming apparatus according to claim 1, wherein the control unit moves forward a drawn image for the text data in next line in units of text lines in order to fill a blank generated in an output image by not drawing the image data.

4. The image forming apparatus according to claim 1, wherein the control unit moves forward a drawn image for the text data in next line in units of strings or characters in order to fill a blank generated in an output image by not drawing the image data.

5. The image forming apparatus according to claim 4, wherein the control unit moves forward a drawn image for the text data in the next line of the generated blank lines in order to fill a blank in units of lines newly generated by moving forward the drawn image for the text data in units of strings or characters.

6. The image forming apparatus according to claim 4, further comprising a mark adding unit to add a mark as an identifier,
   wherein the control unit adds the mark as the identifier at the end of text data in destination line of moving forward text data by the mark adding unit.

7. An image forming system, comprising:
   the image forming apparatus according to claim 1; and
   a host apparatus communicably connected to the image forming apparatus that transmits print data to the image forming apparatus.

8. An image forming system, comprising:
   the image forming apparatus according to claim 4.

9. An image forming system, comprising:
   the image forming apparatus according to claim 5.

10. An image forming system, comprising:
    the image forming apparatus according to claim 6.

11. A method of processing image data for output, comprising:
    accepting an image not to be printed, wherein the image not to be printed is selected from a plurality of images and text contents located in a printing area of print data; and
    printing the print data of the plurality of images that were not selected by the acceptance unit,
    wherein the control unit is configured not to print and output the print data of the selected image when the selected image is not sandwiched between a last text line of a first text content and a first text line of a second text content of the print data, and to print and output the print data of the selected image when the selected image is sandwiched between the last text line of the first text content and the first text line of the second text content of the print data.

12. A non-transitory computer-readable storage medium storing a program that, when executed by a computer, causes the computer to implement a method of processing image data,
    the method comprising:
    accepting an image not to be printed, wherein the image not to be printed is selected from a plurality of images and text contents located in a printing area of print data; and
    printing the print data of the plurality of images that were not selected by the acceptance unit,
    wherein the control unit is configured not to print and output the print data of the selected image when the selected image is not sandwiched between a last text line of a first text content and a first text line of a second text content of the print data, and to print and output the print data of the selected image when the selected image is sandwiched between the last text line of the first text content and the first text line of the second text content of the print data.

* * * * *